(12) United States Patent
Hagin et al.

(10) Patent No.: US 12,539,762 B2
(45) Date of Patent: Feb. 3, 2026

(54) CURRENT COLLECTOR AND CONDUCTOR LINE SYSTEM

(71) Applicant: Conductix-Wampfler GmbH, Weil am Rhein (DE)

(72) Inventors: Moritz Hagin, Weil am Rhein (DE); Matthias Wenk, Efringen-Kirchen (DE)

(73) Assignee: Conductix-Wampfler GmbH, Weil am Rhein (DE)

( * ) Notice: Subject to any disclaimer, the term of this patent is extended or adjusted under 35 U.S.C. 154(b) by 915 days.

(21) Appl. No.: 17/640,184

(22) PCT Filed: Nov. 20, 2020

(86) PCT No.: PCT/EP2020/082852
§ 371 (c)(1),
(2) Date: Mar. 3, 2022

(87) PCT Pub. No.: WO2021/105018
PCT Pub. Date: Jun. 3, 2021

(65) Prior Publication Data
US 2022/0314808 A1  Oct. 6, 2022

(30) Foreign Application Priority Data
Nov. 30, 2019  (DE) .................... 10 2019 132 567.6

(51) Int. Cl.
*B60L 5/08* (2006.01)
*B60L 5/12* (2006.01)
(Continued)

(52) U.S. Cl.
CPC *B60L 5/08* (2013.01); *B60L 5/12* (2013.01); *B60L 5/18* (2013.01); *B60L 5/22* (2013.01);
(Continued)

(58) Field of Classification Search
CPC .......... B60L 2200/26; B60L 5/08; B60L 5/12; B60L 5/18; B60L 5/22; B60L 5/38; B60L 5/40; B60L 9/00; B60L 5/30
See application file for complete search history.

(56) References Cited

U.S. PATENT DOCUMENTS 4,108,288 A * 8/1978 Manabe .................... B60L 5/38
191/49
5,464,082 A * 11/1995 Young ....................... B60L 9/00
191/23 R
(Continued)

FOREIGN PATENT DOCUMENTS

CN  201872623 U  6/2011
CN  108725218 A  11/2018
(Continued)

OTHER PUBLICATIONS

Decision of Refusal dated Mar. 14, 2023, for Japanese Patent Application No. 2021-542167 (2 pages).
(Continued)

*Primary Examiner* — Cheng Lin
(74) *Attorney, Agent, or Firm* — Fleit Intellectual Property Law; Paul D. Bianco

(57) ABSTRACT

A current collector for electrically supplying an electrical load which is movable along a conductor line. The current collector has a fastening element and at least one sliding contact with an elongate sliding contact surface, which extends in a longitudinal direction, for sliding contact with an electrically conducting line profile, which extends in the longitudinal direction, of the conductor line. The sliding contact is articulated on the fastening element at spaced apart fastening regions, so as to be movable in a feeding plane extending parallel to the longitudinal direction by means of two articulated lever arrangements. A resetting device acting on the articulated lever arrangements and on
(Continued)

the fastening element is provided which, when the sliding contact is deflected from an inoperative position, in which the sliding contact surface preferably extends substantially parallel to the longitudinal direction, moves the sliding contact back into the inoperative position.

15 Claims, 2 Drawing Sheets

(51) Int. Cl.
| | | |
|---|---|---|
| *B60L 5/18* | (2006.01) | |
| *B60L 5/22* | (2006.01) | |
| *B60L 5/38* | (2006.01) | |
| *B60L 5/40* | (2006.01) | |
| *B60L 9/00* | (2019.01) | |

(52) U.S. Cl.
CPC .................. *B60L 5/38* (2013.01); *B60L 5/40* (2013.01); *B60L 9/00* (2013.01); *B60L 2200/26* (2013.01)

(56) References Cited

U.S. PATENT DOCUMENTS

| | | | | |
|---|---|---|---|---|
| 8,915,341 | B2* | 12/2014 | Schmiedle | ................ B60L 5/12 191/50 |
| 9,643,495 | B2* | 5/2017 | Kanazawa | ................ B60L 5/26 |
| 10,583,742 | B2* | 3/2020 | Lang | ........................ B60L 5/40 |
| 11,018,469 | B2 | 5/2021 | Lang | |
| 2019/0001823 | A1* | 1/2019 | Duprat | ...................... B60L 5/08 |
| 2021/0316613 | A1* | 10/2021 | Lu | ............................ B60L 5/30 |

FOREIGN PATENT DOCUMENTS

| | | | | |
|---|---|---|---|---|
| DE | 2352102 | A1 | 4/1975 | |
| DE | 202015100622 | U1 | 5/2016 | |
| DE | 102017215338 | A1 | 3/2019 | |
| EP | 3495190 | A1 | 6/2019 | |
| FR | 2817203 | A1 | 5/2002 | |
| GB | 335263 | A * | 9/1930 | ................ B60L 5/22 |
| GB | 2369336 | A * | 5/2002 | ................ B60L 5/38 |
| WO | 2020/029713 | A1 | 2/2020 | |

OTHER PUBLICATIONS

Examination Report dated Jul. 8, 2022 for Indian Application No. 202137027489 (5 pages).
Communication dated Feb. 7, 2023, from European Patent Office for Registration No. 20 811 283.0 (18 pages).
Communication dated Dec. 2, 2022, from European Patent Office for Registration No. 20 811 283.9 (16 pages).
Communication dated Mar. 23, 2023, from European Patent Office for Registration No. 20 811 283.9 (60 pages).
International Search Report dated Jan. 27, 2021, with Written Opinion for PCT/EP2020/082852, filed Nov. 20, 2020.
Result of Examination Report for German Patent Application No. 10 2019 132 567.6, filed Nov. 30, 2019.
Written Opinion dated Feb. 5, 2021, for PCT/EP2020/082852 (English translation).
Notification of Reasons for Refusal (Office Action) dated Sep. 6, 2022, for Japanese Application No. 2021-542167.
Second Office Action dated Apr. 20, 2024 for Chinese Patent Application No. 202080013537.5.
International Preliminary Report on Patentability dated May 17, 2022, for PCT/EP2020/082852 (English translation).

\* cited by examiner

CURRENT COLLECTOR AND CONDUCTOR LINE SYSTEM

FIELD OF THE INVENTION

The present invention relates to a current collector and a conductor line system.

BACKGROUND

In the field of conductor line systems, there are an increasing number applications in which current collectors, along with their sliding contacts, must move frequently into and subsequently out of the conductor line. In addition, the speeds of the electrical loads which are supplied with electrical energy and/or data by the current collectors by means of the conductor line are increasing. Thus, it is becoming increasingly important to adapt the movement of the sliding contacts out of and into the conductor line to these frequently alternating cycles and higher speeds. To implement this, the two spring arms used for the current collectors, which are known, for example, from DE 20 2015 100 622 U1, and by means of which the sliding contacts are held in the direction of the conductor line and continuously pressed against the conductor line, prove to have disadvantages for a number of different reasons. One of the reasons is that these current collectors and their spring arms are often relatively long and have a number of degrees of freedom for different directions of movement. Thus, to move the sliding contact into the conductor line, an entry funnel is needed, which causes the front end of the sliding contact, with respect to the entry direction, to strike the entry funnel with a relatively high force, thus leading to an increased load on the spring arm and the sliding contact and thereby having an unfavorable effect on the service life. In addition, there is a risk that the sliding contact will be improperly fed into the line profile and therefore not properly seated therein during subsequent movement in the conductor line.

A second disadvantage of the prior-art current collectors with spring arms is that, because of the long spring arm and the largely freely oscillating sliding contact that is fastened to its end, considerable vibrations can occur when the sliding contact is released, i.e., in the fully extended state of the spring arm, which, by standard practice, is pushed away from the current collector toward the conductor line. These vibrations also increase the wear and tear on the spring arm.

DE 23 52 102 A1 discloses a current transmission system for track-guided vehicles with a plurality of conductor rails, which are mounted along the travel path and which have sliding surfaces arranged parallel to one another and facing the same side of the rail arrangement, and a contact carrier with contact pieces, which are spaced apart from each other and which slide on the conductor rails, said contact carrier being connected to the vehicle and being able to be lifted off the rail arrangement. The sliding surfaces of the conductor rails are located in at least two planes, and the contact carrier is swivelably mounted about an axis which extends parallel to the rails and which represents the gravity line of the center lines of the sliding surfaces. This should result in a highly uniform distribution of the overall contact pressure acting on all spaced-apart contact pieces.

GB 335263 A discloses current collectors, such as are used in electric railway carriages, having a connecting shoe with a contact pressure control spring which presses the connecting shoe against the conductor rail, whereby the contact pressure control spring can be compressed to an extremely low overall height. A pair of connecting levers are rotatably suspended on a frame via articulated pins. On its opposite ends, the connecting shoe also has a pin which engages in slotted holes arranged on the connecting levers.

CN 201872623 U discloses a pantograph-type current collector, whereby a sliding contact is pneumatically moved to a contact surface by means of a four-bar linkage connecting mechanism.

WO 2020/029713 A1 discloses an electric vehicle having a current collector for contacts and consisting of a contact slide plate which is mounted on the vehicle by means of two jointly spring-loaded curved connecting rods which are connected by means of a lever arrangement. One of the connecting rods is connected directly to the contact slide plate and the other connecting rod is connected to the contact slide plate via an articulated lever. Because the two connecting rods are connected to one another, diversionary movements of the connecting rods are always interdependent on each other.

SUMMARY OF THE INVENTION

Thus, the present invention relates to a current collector and a conductor line system which address the above-mentioned disadvantages and which provide an optimally compact and vibration-insensitive configuration of the current collector.

Advantageous advanced modifications and embodiments are disclosed herein.

According to the invention, an above-mentioned current collector is characterized in that the sliding contact is movably articulated to the fastening element at fastening regions, which are spaced apart from one another in the longitudinal direction, by means of two articulated lever arrangements so as to be movable in a feed plane extending parallel to the longitudinal direction, wherein a reset device acting on the articulated lever arrangements, on the one hand, and on the fastening element, on the other hand, is provided, which reset device moves the sliding contact back into the inoperative position when the sliding contact is deflected from an inoperative position in which the sliding contact surface preferably extends substantially parallel to the longitudinal direction.

In this context, and hereinafter, the term 'substantially parallel' is not intended to refer to a mathematically exact parallel alignment but allows for slight deviations from the parallel alignment by a few angular degrees, which can arise, e.g., as a result of wear and tear, weathering effects, temperature effects, production process-dependent inaccuracies and tolerances, conductor lines that do to extend or are not mounted in exactly straight lines, or for any other reasons.

Each of the articulated lever arrangements can preferably have an articulated lever which is rotatably articulated to the fastening element, and a lever arm which is rotatably mounted on the articulated lever, on the one hand, and rotatably mounted on the sliding contact, on the other hand. The lever arms can advantageously be configured as angular levers.

The reset device can elastically, particularly spring-elastically, connect the two lever arms to the fastening element. To this end, instead of the spiral springs shown in the drawings and described in detail below, other and different elastic, particularly spring elastic, elements can be used as well, for example, elastic rubber buffers, pneumatic cylinders, etc.

The reset device can preferably comprise an elastic tension/compression arrangement with a first tension/compression region and a second tension/compression region, with the first tension/compression region being connected to the lever arm of the first articulated lever arrangements, on the one hand, and to the fastening element, on the other hand, and with the second tension/compression region being connected to the lever arm of the second articulated lever arrangements, on the one hand, and to the fastening element, on the other hand. Instead of the spiral springs shown in the drawings and described in detail below, other and different types of tension/compression elements known to those skilled in the art can also be used to implement the tension/compression regions of the tension/compression arrangement, for example, elastic rubber buffers, pneumatic cylinders, etc. Thus, the tension/compression arrangement can preferably have a first tension/compression element for creating the first tension/compression region and a spaced-apart second separate tension/compression element for creating the second tension/compression region. The tension/compression arrangement can advantageously also comprise a single tension/compression element which is disposed between the two tension/compression regions on the fastening element so as to create the first tension/compression region and the second tension/compression region. The first tension/compression region and/or the second tension/compression region can advantageously be aligned parallel to the longitudinal direction. In particular, the first tension/compression region and/or the second tension/compression region can preferably be aligned at a maximum angle of 45° relative to the longitudinal direction, more preferably at a maximum angle of 15° relative to the longitudinal direction. In an advantageous modification, the tension/compression element can be a spring arrangement, and the first tension/compression region can be a first spring region and the second tension/compression region can be a second spring region.

In a further advantageous addition, the reset device can comprise a damping element.

One or a plurality of axes of rotation, about which parts of the articulated lever arrangement, in particular the articulated levers and the lever arms, can be rotated, can preferably be disposed perpendicular to the feed plane. One or a plurality of axes of rotation, about which parts of the articulated lever arrangement can be rotated, can also be inclined relative to a perpendicular to the feed plane, preferably by a maximum angle of 20°, more preferably by a maximum angle of 5° relative to the perpendicular. The feed plane can preferably be generated by the longitudinal direction and a feed direction of the sliding contact extending perpendicular to the longitudinal direction from and to the conductor line.

The sliding contact can advantageously be disposed on the current collector in an electrically insulated manner. Furthermore, a plurality of sliding contacts can advantageously be aligned on the current collector flush next to each other in the longitudinal direction, each sliding contact having a dedicated articulated lever arrangement and reset device.

According to the invention, the above-mentioned conductor line system is characterized in that the articulated lever arrangement comprises a reset device which moves the sliding contact back into the inoperative position when the sliding contact is deflected from an inoperative position in which the sliding contact surface preferably extends substantially parallel to the longitudinal direction. To this end, a current collector as described above and below can be used. The current collector can be configured as described above and below.

BRIEF DESCRIPTION OF THE DRAWINGS

The invention will be described below by means of detailed illustrative embodiments with reference to the accompanying drawings. These drawings show.

DETAILED DESCRIPTION OF THE INVENTION

Figure 1:
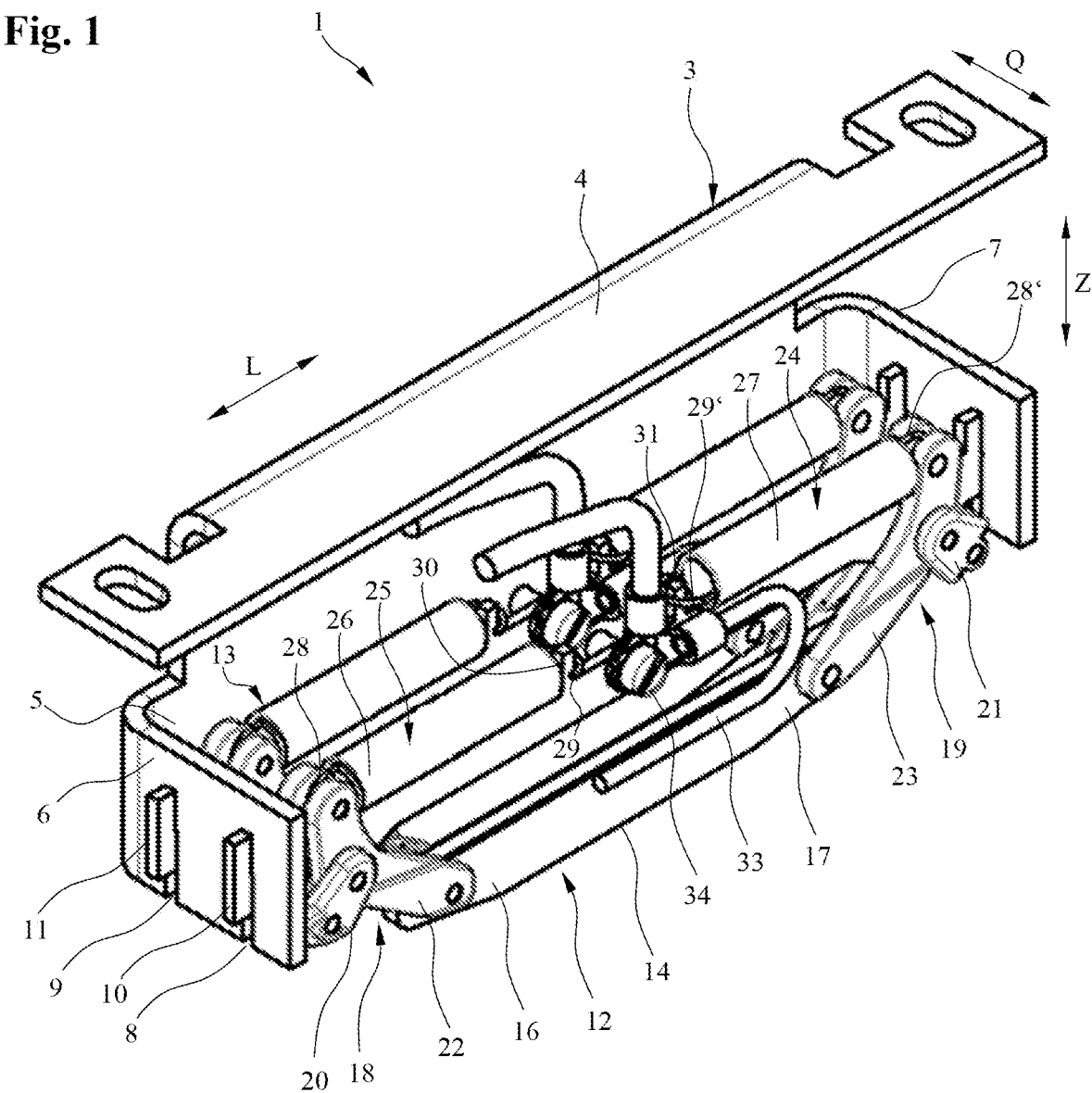
FIG. 1 a three-dimensional oblique view of a current collector according to the invention.

FIG. 1 shows a three-dimensional oblique view of a current collector 1 according to the invention for supplying an electrical load 2 with electrical energy and/or data. The current collector 1 has a fastening frame 3 which is screwed to the electrical load 2 via a fastening plate 4. The fastening plate 4 is adjoined by a retaining plate 5 which is bent downwardly at an approximately right angle and which in its lower region has two retaining legs 6, 7 bent in a U-shape at an approximately right angle. In the drawings, the retaining leg 6 has two insertion slots 8, 9 which can be accessed from below. Corresponding insertion slots (not shown) are also disposed on the other retaining leg 7.

As seen in the drawings, the opposite ends of carrier plates 10, 11 are inserted from below into the insertion slots 8, 9, and into the oppositely located insertion slots of the right retaining leg 7, on the right in the drawings. To this end, the carrier plates have upwardly open insertion slots (also not shown in detail) which interact with the insertion slots 8, 9 of the retaining plate 5 in a manner known in the art.

Each of the carrier plates 10, 11 carries identically configured sliding contact arrangements 12 and 13. The invention will therefore be explained below based on the front sliding contact arrangement 12 shown in the drawings. Corresponding specifications and embodiments also apply to the sliding contact arrangement 13.

The sliding contact arrangement 12 has an elongate sliding contact 14 with a sliding contact surface 15 facing downwardly from the fastening plate 4 in the feed direction Z of the sliding contact 14. The sliding contact surface 15 serves in a manner known in the art for electrically contacting an electrically conducting a line profile 102 of a conductor line 101 of a conductor line system 100, which conductor profile extends in a longitudinal direction L, and, in the inoperative position shown in FIGS. 1 and 2, extends substantially parallel to the longitudinal direction L. The longitudinal direction L also corresponds to the direction of movement of the current collector 1 along the conductor line 101, which, as a rule, remains at the same distance from the conductor line 101 in the feed direction. In this context, in addition to an exact mathematical parallel alignment, 'substantially parallel' also allows for slight deviations by a few degrees which may occur e.g., as a result of wear and tear on the sliding contact surface 15, production process-dependent inaccuracies, bent or not completely accurately mounted conductor lines 101 or for any other reasons.

The sliding contact 14 has fastening regions 16 and 17 at its front and back end with respect to the longitudinal direction L, which can basically begin already in the middle of the sliding contact 14. However, the fastening regions 16 and 17 can advantageously be provided on the opposite ends of the sliding contact 14 with respect to the longitudinal direction L.

Figure 3:
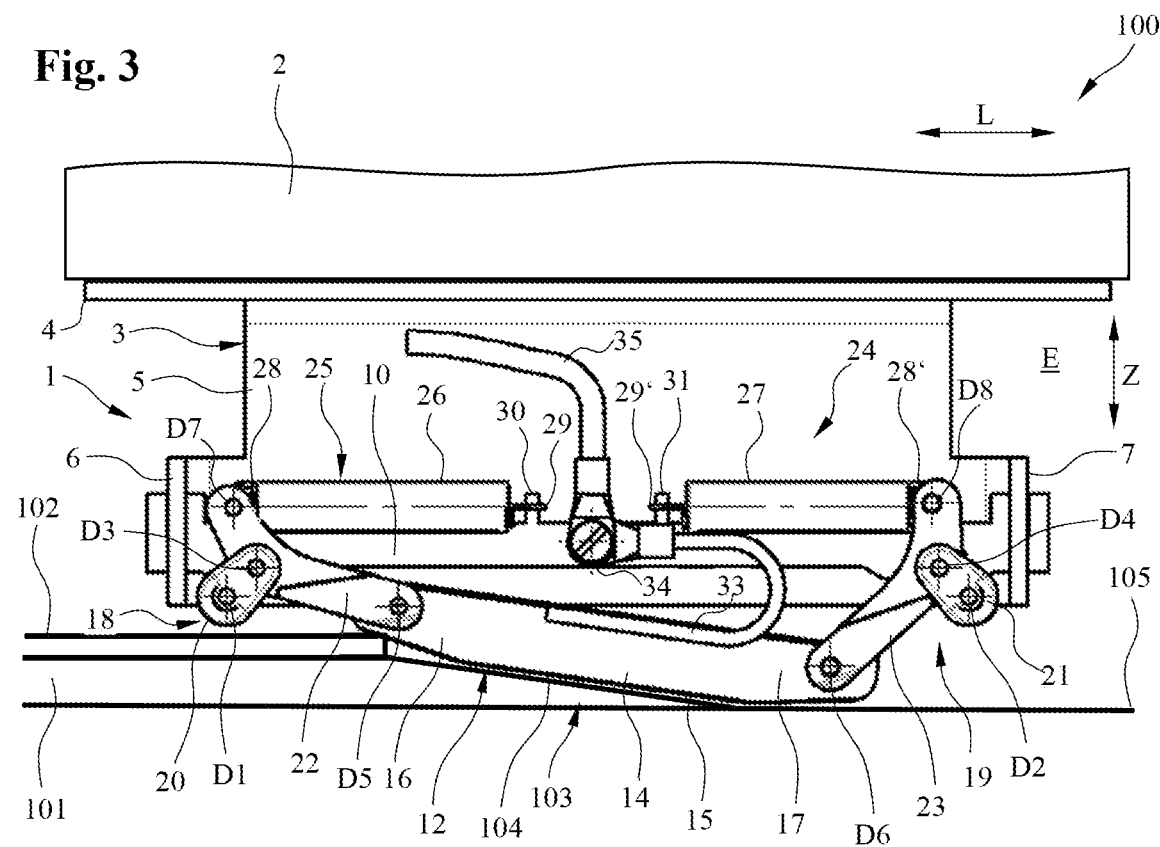
FIG. 3 the front view of FIG. 2 with the current collector shown in FIG. 1 during its movement into the conductor line.

To ensure secure and reliable electrical contact in the power transmission mode, i.e., when the sliding contact 14 has been inserted into, and makes electrical contact with the line profile 102, the sliding contact 14 is always pushed by spring force in the feed direction Z toward the conductor line 101 and away from the fastening frame 3, as described in detail below. Nevertheless, during insertion of the sliding contact 14 into the line profile 102, the sliding contact should be able to move and swerve within a feed plane E that is generated by the feed direction Z and the longitudinal direction L, as shown in FIG. 3.

To this end, the sliding contact 14 is rotatably articulated to the carrier plate 10 by means of two substantially identically configured articulated lever arrangements 18, 19 which are, however, arranged as mirror images of one another. Therefore, mainly the articulated lever arrangement 18 shown on the left side of the drawings will be described below, with the explanations provided also applying to the articulated lever arrangement 19.

The articulated lever arrangement 18 comprises an articulated lever 20 which is formed by two parts arranged in parallel and which is articulated to the carrier plate 10 so as to be rotatable about an axis of rotation D1. The axis of rotation D1 is disposed perpendicular to the feed plane E. The parallel parts of the articulated lever 20 encompass the carrier plate 10, and the axis of rotation D1 extends through the two parts, with the carrier plate 10 therebetween. However, the articulated lever 20 can also be configured differently, for example, as a single articulated lever on one side only. The embodiment described here has the advantage that the two parts are symmetrically disposed on the right and left side of the carrier plate 10, which ensures a uniform load on the axis of rotation D1.

A lever arm 22 is arranged on the articulated lever 20 so as to be rotatable about an axis of rotation D3 which is located at a distance from the axis of rotation D1. In this embodiment, the lever arm 22 is configured in the form of an angled lever arm with a shorter and a longer arm, which extend at an angle other than 180° relative to one another. The angle can preferably be a flat angle, an angle of approximately 160° in the present illustrative embodiment. Thus, the axis of rotation D3 is located in the area at the tip of the angle formed between the shorter and the longer arm of the lever arm 22, with the tip pointing to the articulated lever 20 and with the ends of the arms of the lever arm 22 pointing away from the articulated lever 20. The axis of rotation D3 is also disposed perpendicular to the feed plane E.

On the one hand, the longer arm of the lever arm 22 is rotatably articulated about an axis of rotation D5 in the region 16 of the sliding contact 14. The shorter arm of the lever arm 22, on the other hand, is rotatably mounted about an axis of rotation D7 on a reset device 24. The axes of rotation D3 and D5 are also disposed perpendicular to the feed plane E. The statements above also apply mutatis mutandis to the axes of rotation D2, D4, D6 and D8 of the second correspondingly configured articulated lever arrangement 19.

The reset device 24 comprises a spring arrangement 25 which has a first return spring 26 and a separate second return spring 27. The return spring 26 is rotatably disposed on the axis of rotation D7 by a spring eye 28 shown on the left side of the drawings and fastened to a retaining mandrel 30 of the carrier plate 10 by means of the spring eye 29 shown on the right side of the drawings. In the embodiment shown in FIGS. 1 and 2, the return spring 26 is preferably uncompressed so that, by interacting with the correspondingly configured, preferably also uncompressed second return spring 27 of the articulated lever arrangement 19, which is fastened to the retaining mandrel 31, it retains the sliding contact 14 in the inoperative position shown in FIGS. 1 and 2. Alternatively, following a general idea of the invention, the return springs 26, 27 can preferably also be tension- or compression-biased in the same direction, for example, both can be tension-biased so that, in the inoperative position, they always exert a force on the sliding contact 14 in the feed direction Z toward the conductor line 101 and away from the fastening frame 3 and, during an only brief deflection of the sliding contact 14 from the inoperative position in the feed direction Z, away from the conductor line 101 and toward the fastening frame 3, in addition to pushing the sliding contact 14 toward the conductor line 101.

Instead of the spiral springs 26, 27 described and shown in the drawings, following a general aspect of the invention, other types of tension/compression elements, for example, elastic rubber buffers, pneumatic cylinders, etc., can be used.

Figure 2:
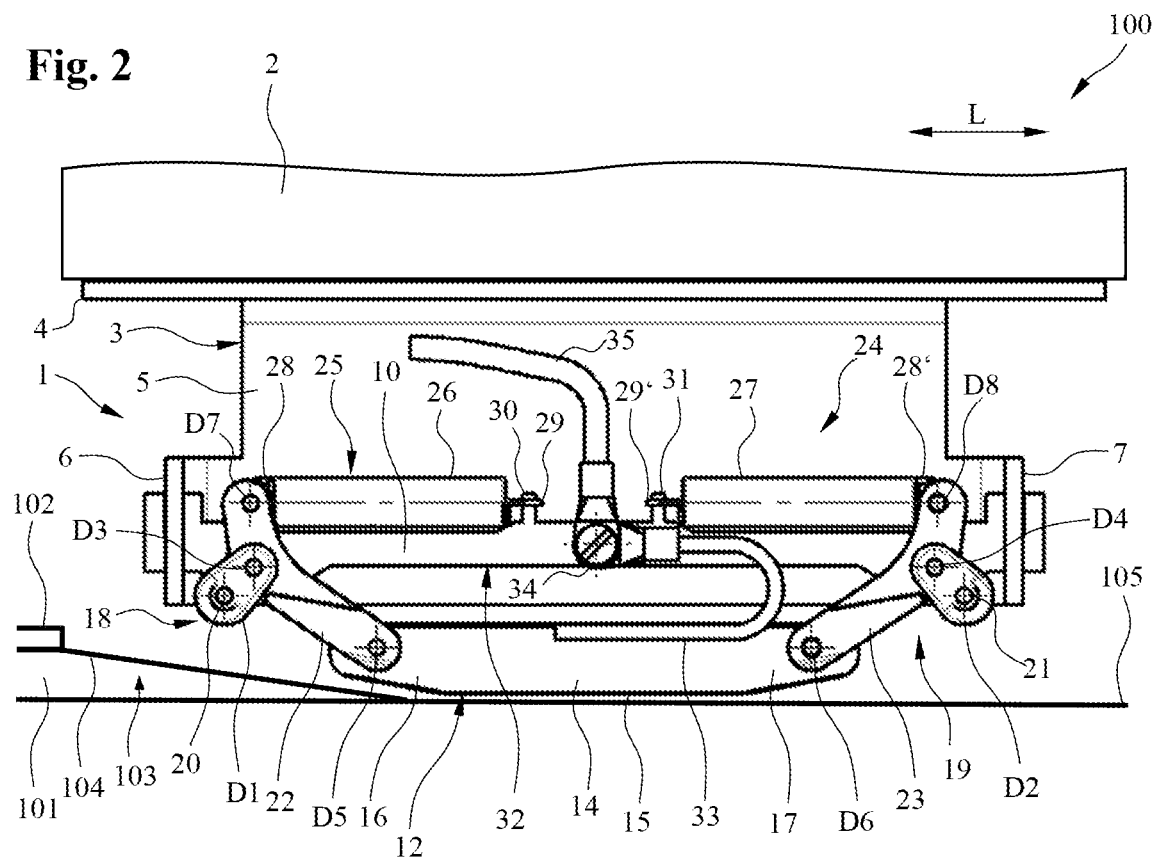
FIG. 2 a front view of a conductor line system according to the invention with the current collector shown in FIG. 1 prior to same being moved into a conductor line.

The reason is that during a deflection of the sliding contact 14, which is shown by way of an example in FIG. 3, from its inoperative position shown in FIGS. 1 and 2, the left lever arm 22 is, inter alia, rotated counterclockwise about the axis of rotation D3 so that the first return spring 26 is pulled apart and tensioned, and a tensile force develops in the direction of the retaining mandrel 30. The right lever arm 23, on the other hand, is pushed to the right by the sliding contact 14 so that it also rotates counterclockwise about the axis of rotation D4 and thereby compresses the second return spring 27 which, as a result, exerts a compressive force toward the right and away from the retaining mandrel 31.

At the same time, the short articulated levers 20, 21, which are rotatably arranged on the carrier plate 10 of the fastening frame 3, make it easier for the sliding contact 14 to swerve, not only in the longitudinal direction L but also in the feed direction Z.

The reset forces of the return springs 27 generated by a deflection of the sliding contact 14 from the inoperative position subsequently ensure that the sliding contact 14 is moved back into the inoperative position as soon as the cause of the deflection is removed. When the sliding contact 14 has fully entered the line profile 102, i.e., when it is in the operating position for electrical power transmission, the articulated lever arrangements 18, 19 ensure that in both return springs 26, 27, the same high reset force is generated, which pushes the sliding contact 14 and especially the sliding contact surface 15 uniformly against the line profile 102 and thus ensures reliable and close electrical contact.

Instead of the two-piece spring arrangement 25 with spaced-apart return springs 26, 27 described above and shown in the drawings, the spring arrangement can, however, also be configured as a single spring element which is clamped, for example, between the two axes of rotation D7 and D8 and is additionally fastened at its center or at two points corresponding to the retaining mandrels 30, 31 to the carrier plate 10, thereby forming a first spring region toward the first lever arm 22 and a separate spaced-apart second spring region toward the second lever arm 23. Again, because of the reset forces of the two spring regions of the sliding contact 14 generated by the deflection of the sliding contact 14 from the inoperative position and acting in opposite directions, the sliding contact 14 can be moved back into the inoperative position as soon as the cause of the deflection is removed.

In the present illustrative embodiment, the return springs 26, 27 or, in the above-described alternative, the spring arrangement with the two spring regions are preferably aligned parallel to or largely parallel to the longitudinal direction. This leads to a sliding contact arrangement which is shorter and more compact in the feed direction. However, in alternative embodiments, the spring arrangement can also be aligned differently; for example, the return springs 26, 27 could extend obliquely upward and be disposed in a region along the longitudinal direction L between the two most inwardly directed positions of the axis of rotation D7, D8 in order to still be able to exert tension and pressure on the lever arms 22, 23.

However, in an alternative embodiment, the lever arm 22 can also be configured differently, e.g., as a straight lever arm with equally long arms. In addition, a different configuration of the axes of rotation can be used; for example, the articulated lever 20 can be articulated about the axis of rotation D7 on the shorter arm of the lever arm 22, and the return spring 26 on the lever arm in the region between this axis of rotation D7 and the axis of rotation D5 disposed on the longer arm of the lever arm 22. In that case, the arrangement of the return spring 26 and the articulated lever 20 is reversed in the feed direction Z. Other and different embodiments will also become apparent to those skilled in the art.

The key factor is that the articulated lever arrangements 18, 19, in interaction with the reset device 24, ensure that in an unloaded state, the sliding contact 14, with the sliding contact surface 15 substantially parallel to the longitudinal direction L is moved, on the one hand, into an inoperative position, and, on the other hand, can be optimally moved out of this inoperative position and possibly guided on both sides in order to move it into the conductor line 101.

To connect the sliding contact 14 electrically to the electrical load for to transmitting electric power, one end of a highly flexible sliding contact line 33 is connected to the sliding contact 14 in an electrically conductive manner, and the other end is fastened to a fastening screw 34 on the carrier plate 10. A connecting line 35 to the electrical load, which is electrically connected to the sliding contact line 33, for example, by means of the cable lugs shown in the drawings and known in the art, is also fastened to the carrier plate 10 by means of the fastening screw 34. Other and different fastening means will also become apparent to those skilled in the art.

Instead of articulating the sliding contact 14 directly to the articulated lever arrangement 18, 19, the sliding contact 14 can preferably also be disposed in an electrically insulating sliding contact holder which, instead of the sliding contact 14, is rotatably articulated to the articulated lever arrangements 18, 19 about the axes of rotation D5, D6.

As can be seen in FIGS. 2 and 3, to move the sliding contact 14 into the line profile 102, the conductor line 101 comprises an entry assistance means 103. To this end, the current collector 1 first moves in the direction of the entry assistance means 103, from the position shown in FIG. 2, in the longitudinal direction L along a stop plate 105 of the conductor line 101, which stop plate also extends in the longitudinal direction L. The spring arrangement 25 retains the sliding contact 14 in its extended inoperative position in which the sliding contact 14 and particularly the sliding contact surface 15 extend in and parallel to the longitudinal direction L. To prevent the sliding contact 14 from being wedged in as it approaches the entry ramp 104, and to facilitate entry into the ramp, the ends of the sliding contact 14 facing the longitudinal direction L are chamfered upwardly from the center of the sliding contact toward the ends thereof.

To make it easier for the sliding contact 14 to swerve in the feed direction Z toward the fastening plate 4 and away from the conductor line 101, the carrier plate 10 has a recess 32 which extends between the two articulation points of the articulated levers 20 and 22 about the axes of rotation D1 and D2. As shown on the left in FIG. 3, the sliding contact 14 or its end can be diverted into the recess 32 without striking the carrier plate 10.

The illustrative embodiment described here offers the advantage that a flat and compact construction of the current collector 1 can be achieved, in part also because of the return springs 26, 27 and the articulated lever arrangements 18, 19, which extend in the longitudinal direction L or at a short angular distance of up to 45°, preferably up to 20°. Furthermore, fastening the sliding contact 14 to both sides decreases the susceptibility of the current collector 1 to vibrations and ensures a more stable and more uniform travel of the sliding contact 14 in the line profile 102. The current collector 1 is also more stable and less susceptible to getting wedged in or the like, especially as it moves into the line profile 102.

LIST OF REFERENCE CHARACTERS

1 Current collector
2 Electrical load
3 Fastening frame
4 Fastening plate
5 Retaining plate
6, 7 Retaining legs
8, 9 Insertion slots
10, 11 Carrier plates
12, 13 Sliding contact arrangements
14 Sliding contact
15 Sliding contact surface
16, 17 Fastening regions
18, 19 Articulated lever arrangements
20, 21 Articulated levers
22, 23 Lever arms
24 Reset device
25 Spring arrangement
26, 27 Return springs
28, 28', 29, 29' Spring eyes
30, 31 Retaining mandrels for the return springs
32 Recess
33 Sliding contact line
34 Fastening screw
35 Connecting line to the load
100 Conductor line system
101 Conductor line
102 Line profile
103 Entry assistance means
104 Entry ramp
105 Stop plate
D1, D2 Axes of rotation of the articulated lever on the carrier plate
D3, D4 Axes of rotation of the lever arm on the articulated lever D5, D6 Axes of rotation of the lever arm on the sliding contact
D7, D8 Axes of rotation of the lever arm on the return spring
E Feed plane
L Longitudinal direction of the conductor line, longitudinal direction of the current collectors
Q Transverse direction
Z Feed direction for the sliding contact

The invention claimed is:

1. A current collector for electrically supplying an electrical load which is movable along a conductor line, with the current collector having a fastening element and at least one sliding contact with an elongate sliding contact surface, which extends in a longitudinal direction, for making sliding contact with an electrically conducting line profile of the conductor line which extends in the longitudinal direction,
wherein the sliding contact is articulated on the fastening element at fastening regions spaced apart from one another in the longitudinal direction so as to be movable in a feed plane extending parallel to the longitudinal direction by means of two articulated lever arrangements,
wherein a reset device acting on the articulated lever arrangements and on the fastening element is provided,
wherein the reset device moves the sliding contact back into an inoperative position when the sliding contact is deflected from the inoperative position in which the sliding contact surface preferably extends substantially parallel to the longitudinal direction, and
wherein each of the articulated lever arrangements has an articulated lever, which is rotatably articulated to the fastening element, and a lever arm which is rotatably arranged on the articulated lever and roatably arranged on the sliding contact.

2. The current collector of claim 1, wherein the lever arms are configured in the form of an angled lever.

3. The current collector of claim 1, wherein the reset device connects the each of the lever arms elastically to the fastening element.

4. The current collector of claim 3, wherein the reset device comprises an elastic tension/pressure arrangement with a first tension/compression region and a second tension/compression region, with the first tension/compression region being connected to the lever arm of the first articulated lever arrangement and to the fastening element and with the second tension/compression region being connected to the lever arm of the second articulated lever arrangement and to the fastening element.

5. The current collector of claim 4, wherein the tension/compression arrangement comprises a first tension/compression element for creating the first tension/compression region and spaced-apart second separate tension/compression element for creating the second tension/compression region.

6. The current collector of claim 4, wherein the tension/compression arrangement has a single tension/compression element which is arranged between the two tension/compression regions on the fastening element so as to create the first tension/compression region and the second tension/compression region.

7. The current collector of claim 4, wherein at least one of the first tension/compression region and the second tension/compression region is aligned parallel to the longitudinal direction.

8. The current collector of claim 4, wherein at least one of the first tension/compression region and the second tension/compression region is aligned at a maximum angle of 45° relative to the longitudinal direction.

9. The current collector of claim 4, wherein the tension/compression arrangement is a spring arrangement, and the first tension/compression region is a first spring region, and the second tension/compression region is a second spring region.

10. The current collector of claim 1, wherein the reset device comprises a damping element.

11. The current collector of claim 1, wherein one or a plurality of axes of rotation, about which parts of the articulated lever arrangements are rotatable, is disposed perpendicular to the feed plane.

12. The current collector of claim 1, wherein one or a plurality of axes of rotation, about which parts of the articulated lever arrangements are rotatable, is inclined relative to a perpendicular to the feed plane.

13. The current collector of claim 1, wherein the feed plane is generated by the longitudinal direction and a feed direction of the sliding contact extending perpendicular to the longitudinal direction from and to the conductor line.

14. The current collector of claim 1, wherein the sliding contact is arranged on the current collector in an electrically insulated manner.

15. A conductor line system comprising a conductor line and the current collector of claim 1.

* * * * *